United States Patent [19]

Frigo et al.

[11] Patent Number: 4,653,915
[45] Date of Patent: Mar. 31, 1987

[54] METHOD FOR REDUCTION OF POLARIZATION FADING IN INTERFEROMETERS

[75] Inventors: Nicholas J. Frigo, Washington, D.C.; Anthony Dandridge, Alexandria, Va.; Alan B. Tveten, Fort Washington, Md.

[73] Assignee: The United States of America as represented by the Secretary of the Navy, Washington, D.C.

[21] Appl. No.: 722,580

[22] Filed: Apr. 12, 1985

[51] Int. Cl.⁴ .......................... G01B 9/02; G02F 1/01
[52] U.S. Cl. .................................. 356/345; 356/351; 250/225
[58] Field of Search ............... 356/345, 351, 364, 213, 356/218, 225, 226, 227; 350/370; 329/144, 207; 250/200, 206, 216, 225, 578, 237 R

[56] References Cited

U.S. PATENT DOCUMENTS 3,932,039 1/1976 Frey .................................. 350/407 X
4,558,952 12/1985 Kulesh et al. .................... 356/358 X Primary Examiner—Eugene R. LaRoche
Assistant Examiner—David Mis
Attorney, Agent, or Firm—Sol Sheinbein

[57] ABSTRACT

A passive device for reducing polarization fading in interferometers without significantly degrading the signal-to-noise ratio. In one embodiment, light from an interferometer output is passed through a lens to a polarization mask. The polarization mask comprises at least three distinct polarizers which pass distinct states of polarization. After passing through the polarizers each independently polarized signal is detected, demodulated and passed to a means for signal extraction.

9 Claims, 3 Drawing Figures

METHOD FOR REDUCTION OF POLARIZATION FADING IN INTERFEROMETERS

BACKGROUND OF THE INVENTION

The present invention relates to optical fiber interferometric fading, and more particularly to a method of completely eliminating polarization fading in optical fiber interferometers.

A fiber optic interferometer combines the light from two optical paths and causes them to interfere. The interference can be thwarted (i.e., "fade") in several ways. This invention pertains to fading due to polarization drifts. If the states of polarizations of the two arms of the interferometer are co-directional, the interference (sometimes referred to as contrast) is at a maximum and the sensitivity of the interferometer as a sensor or communication channel is greatest. If the polarizations are orthogonal, the two arms do not interfere in the usual configuration, and the sensitivity of the interferometer is zero.

Fiber interferometric sensors attain high sensitivities by exploiting readily achievable long path lengths in the sensing arm of the interferometer. However, the long path lengths also increase the sensor's vulnerability to random environmental perturbations that reduce or "fade" the sensed signal. Interferometers can fade in two ways: (1) the interferometer arms can drift in their relative optical path length (going into and out of quadrature); and (2) the states of polarization (SOP) of the two fields can become orthogonal, which prevents mixing on the photodetector. The first type of fading can be overcome by mechanical length adjustments or passive demodulation schemes, assuming that the polarization fading is not complete. For the second type of fading, an electronically ideal automatic gain control circuit can, in principle, recover signals as the polarization fades, but only at the expense of an arbitrarily large degradation in the signal/noise ratio (SNR). Accordingly, it is desirable to completely eliminate the possibility of total polarization fading and while causing only a minimal (and readily established) reduction in the SNR.

There have been earlier passive methods of treating polarization fading. In one method, nothing is done to control the states of polarization. Instead, as the signal from an interferometer fades, an automatic gain control circuit increases the electrical gain of the amplifier circuitry. Although this method stabilizes the sensitivity of the interferometer, the signal-to-noise ratio (SNR) can degrade without limit. In another method, polarization preserving fiber is used in each arm of the interferometer. Since, however, perfectly polarization preserving fibers and components have not yet been demonstrated, this approach is susceptible to excess phase noise.

In active approaches the states of polarization emerging from the output end of an optical fiber are analyzed and used to form an error signal. A servo device then corrects the polarization state. Such devices are more complicated to use and maintain than passive devices, and achieve good stabilization properties at the expense of complicated servo loops.

SUMMARY OF THE INVENTION

Accordingly, it is an object of the present invention to reduce polarization fading in interferometric sensors without significant degradation in the signal-to-noise ratio.

These and other objects of the invention are achieved by providing a fiber optic polarization fading reduction system comprising:

a multi-element polarization mask including several distinct polarizers, each having the characteristic of transmitting a different specified state of polarization;

means for conveying interferometric light outputs to the multi-element polarization mask;

means for detecting light passing through each of the polarizers;

means for conveying the polarized light to said means for detecting light;

a plurality of demodulators, one demodulator for each detector; and means for extracting the desired signal from said demodulator outputs.

The advantage and unique feature of the device is its compactness in conjunction with its utility. With this device, significant polarization fading can be eliminated without significant degradation of the signal-to-noise ratio, while additionally being a passive device.

DESCRIPTION OF THE PREFERRED EMBODIMENT

Figure 1:
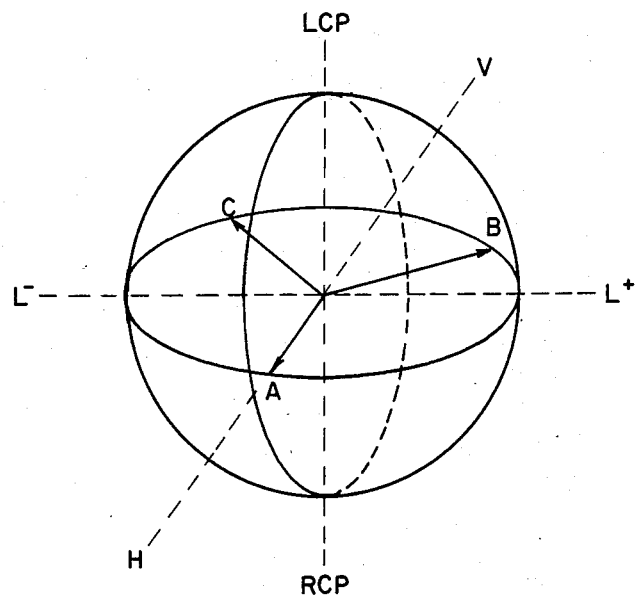
FIG. 1 is a Poincare sphere representation of polarization states.

Referring now to the drawings, wherein like reference characters designate like or corresponding parts throughout the views, FIG. 1 illustrates the technique of the invention with the Poincare sphere representation of polarization states, whereby states of linear polarization (S.O.P) are represented by points along the equator. The projection of one SOP onto another is given by $\cos(\theta/2)$, where $\theta$ is the subtended angle between the two SOPs on the Poincare sphere. Orthogonal SOPs are antipodal (i.e., diametrically opposed) on the sphere. Propagation through birefringent elements (e.g., perturbed optical fiber, retardation plates, etc.) is represented by a rigid rotation of the Poincare sphere. One sees that such elements (and active compensation of input or output SOPs) will not defeat polarization fading since the orthogonality of two states is preserved. Polarizers, however, are not represented by rigid rotations. Regardless of the SOP of an optical input of unit amplitude at the polarizer input, the output from the polarizer has the polarizer's SOP and an amplitude of $\cos(\theta/2)$.

Consider two fields, e.g., the outputs of the two arms of an interferometer, and assume they are orthogonally polarized. As such, they will not mix on a photodetector and are completely polarization faded. However, if the two fields are made to pass through a polarizer, whose SOP is not orthogonal to either field, both fields will be partially transmitted through the polarizer and since the resultant fields are co-polarized and non-zero they can mix on a photodetector. The polarization orthogonality of the input fields is thus broken by the polarizer. The ability of polarizers to break down the orthogonality of two SOPs forms the basis of the device, as described in the next paragraph.

If the reference and signal fields of an interferometer are orthogonal (for instance, H, V in FIG. 1) they will not mix on the photodetector face and the output fades. A polarizer at 45° in real space to the two axes (e.g. L+ in FIG. 1) placed between the output and the detector produces a signal at the detector since both fields have a projection along that axis. On the other hand, an originally unfaded signal (derived for instance, from SOPs H and L+) fades if the polarizer is orthogonal to either of the SOPs (V or L−). By dividing the interferometer's optical output, and passing each divided portion of the optical output signal through its own distinct polarizer, and then detecting each resultant distinctly polarized optical signal separately, the possibility of total signal fading is precluded if there are at least three distinct polarizers. This is because random perturbations in each interferometer arm can generate all possible output SOPs, and thus each of the two arms can independently fade a polarizer/detector channel. Since there is a possibility that two polarizer/detector channels can fade, at least three polarizers are necessary.

Figure 3:
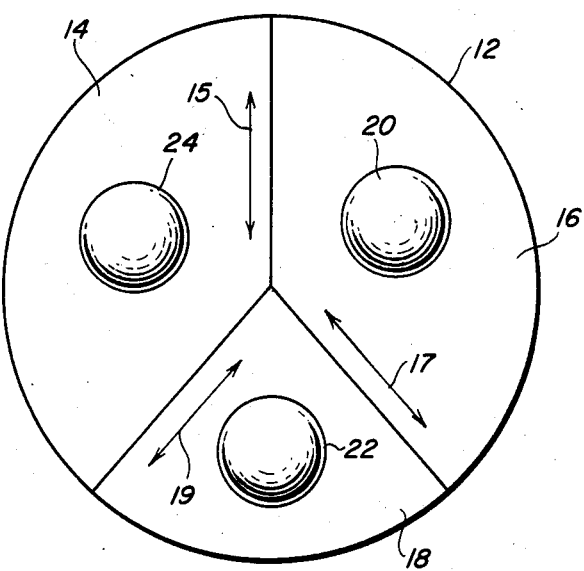
FIG. 3 is a transverse sectional view of FIG. 2 taken in the plane indicated by line 3—3 of FIG. 2.
Figure 2:
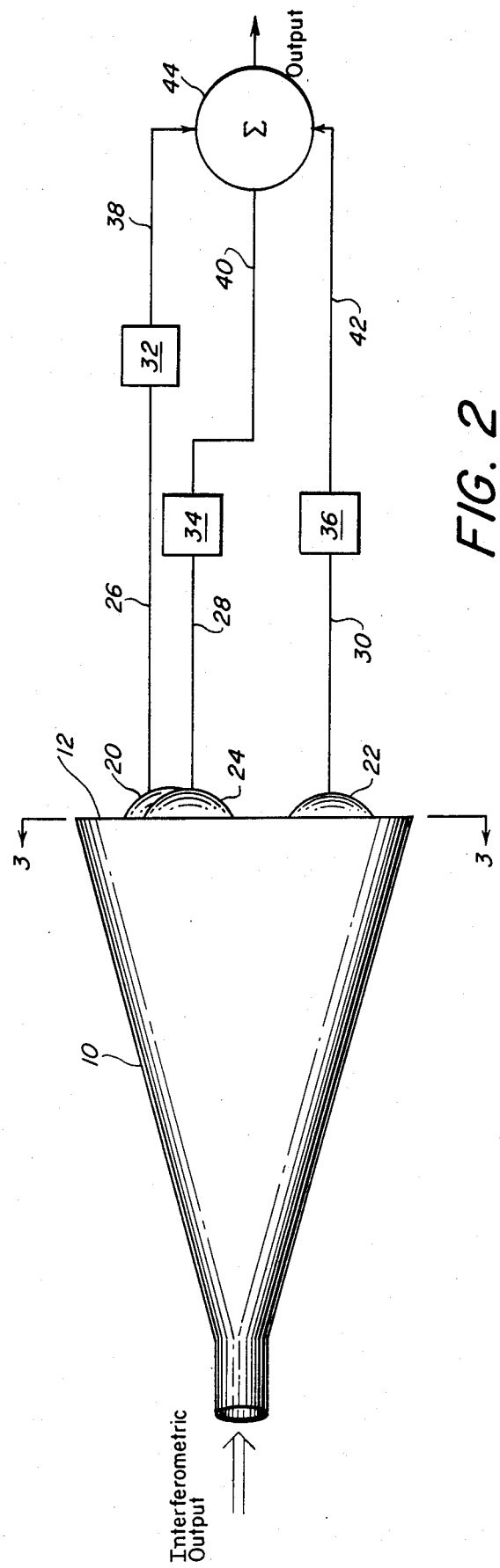
FIG. 2 is a block diagram of one embodiment of the device for reducing fading of the present invention.

A realization of this masking technique is shown in FIGS. 2 and 3. A fiber interferometer's output 10 is directed toward and passed through a mask 12 consisting of three mask segment linear polarizers 14, 16, and 18 whose polarization axes are located 60° in real space, 120° on the sphere apart from each other as illustrated, by way of example with arrows 15, 17, and 19 in FIG. 3. Behind each mask segment 14, 16, and 18 is a respective detector 24, 20, and 22, which detects the light passing through the polarizer and generates an electrical signal on lines 28, 26, and 30, respectively. Any conventional photodetection means will work with the invention. The detected signals in lines 26, 28, and 30 are then demodulated, by means such as phase sensitive detectors 32, 34, and 36 for example. The demodulated signals shown on lines 38, 40, and 42 are then summed by a summing device 44. In the preferred embodiment, a conventional operational amplifier summing device 44 was used.

Consideration of the SOPs marked A, B, and C, in FIG. 1, shows that it is impossible for all three detectors to fade simultaneously, since the failure of two detectors requires the success of the third. Similarly, four judiciously chosen polarizer SOPs would guarantee two non-fading outputs, and so on.

Although its application to interferometric sensors is emphasized, it is applicable as well to other coherent systems (e.g., coherent communication) which optically mix two electromagnetic fields.

Obviously, many modifications and variations of the present invention are possible in the light of the above teachings. It is therefore to be understood that within the scope of the appended claims, the invention may be practiced otherwise than as specifically described.

What is claimed and desired to be secured by Letters Patent in the United States is:

1. A device for reducing fading in interferometers comprising:
   at least three distinct polarizers which pass different distinct states of polarization;
   means for conveying electromagnetic radiation output from said interferometer to each of said at least three distinct polarizers;
   a plurality of detectors, one respective detector associated with each polarizer for detecting the radiation passing trough that polarizer;
   means for conveying the polarized radiation to said plurality of detectors;
   a plurality of demodulators, one demodulator associated with each detector, for decoding the informaiton from respective detectors; and
   means for extracting the desired signal from said demodulator outputs.

2. The device of claim 1, wherein said signal extraction means comprises:
   an electrical summing device for summing the electrical outputs of said plurality of demodulators.

3. The device of claim 1, wherein said means of conveying interferometric light comprises:
   free space volume.

4. The device of claim 1, wherein said means of conveying interferometric light comprises:
   optical fiber.

5. The devices of claim 1, wherein said means of conveying polarized light comprises:
   free space volume.

6. The device claim 1, wherein said means of conveying polarized light comprises optical fiber.

7. The device of claim 1, wherein three independent polarizers, which pass different independent states of polarization, have a relative polarization angle of 60° with respect to each other.

8. A method for reducing polarization fading in interferometers comprising the steps of:
   forming at least three distinctly polarized electromagnetic waves from an interferometric output;
   detecting and demodulating in each of said at least three separate distinctly polarized electromagnetic waves; and
   summing the detected and demodulated at least three separate differently-polarized waves.

9. A method for reducing polarization fading in an interferometer, comprising the steps of:
   projecting the interferometric output, which consists of a reference field component and a sensor field component, onto at least three polarizers which pass independent states of polarization thereby altering the polarization of the two fields;
   detecting the waves passed through each polarizer with an associated detection means;
   demodulating the detected waves; and
   extracting the signal from the demodulators.

* * * * *